United States Patent
Collina et al.

(10) Patent No.: US 10,125,200 B2
(45) Date of Patent: Nov. 13, 2018

(54) CATALYST COMPONENTS FOR THE POLYMERIZATION OF OLEFINS

(75) Inventors: Gianni Collina, Ferrara (IT); Anna Fait, Ferrara (IT); Ofelia Fusco, Ferrara (IT); Giampiero Morini, Padua (IT); Lorella Pedriali, Ferrara (IT); Rosa Spoto, Ferrara (IT); Paolo Vincenzi, Ficarolo (IT)

(73) Assignee: Basell Poliolefine Italia S.r.l., Milan (IT)

( * ) Notice: Subject to any disclaimer, the term of this patent is extended or adjusted under 35 U.S.C. 154(b) by 342 days.

(21) Appl. No.: 13/120,459

(22) PCT Filed: Sep. 17, 2009

(86) PCT No.: PCT/EP2009/062056
§ 371 (c)(1),
(2), (4) Date: Mar. 23, 2011

(87) PCT Pub. No.: WO2010/034664
PCT Pub. Date: Apr. 1, 2010

(65) Prior Publication Data
US 2011/0251352 A1    Oct. 13, 2011

Related U.S. Application Data

(60) Provisional application No. 61/195,129, filed on Oct. 3, 2008.

(30) Foreign Application Priority Data

Sep. 26, 2008 (EP) .................... 08165213

(51) Int. Cl.
| | | |
|---|---|---|
| *B01J 31/04* | (2006.01) | |
| *B01J 31/06* | (2006.01) | |
| *C08F 10/02* | (2006.01) | |
| *C08F 10/06* | (2006.01) | |
| *C08F 210/16* | (2006.01) | |
| *B01J 31/02* | (2006.01) | |
| *B01J 31/14* | (2006.01) | |
| *B01J 31/22* | (2006.01) | |
| *B01J 31/26* | (2006.01) | |
| *B01J 31/38* | (2006.01) | |

(52) U.S. Cl.
CPC .............. *C08F 10/02* (2013.01); *C08F 10/06* (2013.01); *C08F 210/16* (2013.01); *B01J 31/0201* (2013.01); *B01J 31/0235* (2013.01); *B01J 31/0272* (2013.01); *B01J 31/143* (2013.01); *B01J 31/2208* (2013.01); *B01J 31/26* (2013.01); *B01J 31/38* (2013.01)

(58) Field of Classification Search
CPC ............ B01J 31/04; B01J 31/06; C08F 10/00
USPC ........................................ 526/352
See application file for complete search history.

(56) References Cited

U.S. PATENT DOCUMENTS

| | | | |
|---|---|---|---|
| 4,298,718 A | 11/1981 | Mayr | |
| 4,495,338 A | 1/1985 | Mayr | |
| 5,283,278 A * | 2/1994 | Daire et al. | 524/399 |
| 5,463,000 A * | 10/1995 | Miyoshi et al. | 526/119 |
| 6,034,189 A * | 3/2000 | Shinozaki et al. | 526/125.3 |
| 6,451,726 B1 * | 9/2002 | Zambon et al. | 502/152 |
| 6,468,938 B1 * | 10/2002 | Govoni | C08F 10/00 502/126 |
| 6,645,901 B2 * | 11/2003 | Goto et al. | 502/104 |
| 7,223,712 B2 | 5/2007 | Morini et al. | |
| 7,427,653 B2 | 9/2008 | Brita et al. | |
| 2007/0021295 A1 * | 1/2007 | Morini | C08F 10/00 502/103 |
| 2009/0171044 A1 * | 7/2009 | Spencer | 526/125.3 |

FOREIGN PATENT DOCUMENTS

| | | |
|---|---|---|
| CN | 1287560 A | 3/2001 |
| EP | 435332 A2 | 7/1991 |
| EP | 541760 | 5/1993 |
| EP | 782587 | 7/1997 |
| WO | 199844009 | 10/1998 |
| WO | 1999048929 | 9/1999 |
| WO | WO-0008065 A2 | 2/2000 |
| WO | 2002051544 | 7/2002 |
| WO | 2003002617 | 1/2003 |

OTHER PUBLICATIONS

Garoff et al: Decrease in activity caused by hydrogen in Ziegler-Natta ethene polymerization—European Polymer Journal, Pergamon Pres Ltd, Oxford GB—vol. 38 No. 1—Jan. 1, 2002 pp. 121-132 XP004308066—ISSN 0014-3057—p. 123 paragraph 2.4—p. 127 example catD table 3.

* cited by examiner

*Primary Examiner* — Fred M Teskin
*Assistant Examiner* — Elizabeth Eng

(57) ABSTRACT

Prepolymerized catalyst component for the polymerization of olefins $CH_2=CHR$, wherein R is hydrogen or a $C_1$-$C_{12}$ hydrocarbyl group, comprising a solid catalyst component characterized by comprising Mg, Ti halogen and an electron donor (ID) selected from the alkyl esters of aromatic dicarboxylic acids in such an amount that the molar ratio ID/Mg ranges from 0.025 to 0.07 and the Mg/Ti molar ratio is higher than 13, said prepolymerized catalyst component containing an amount of ethylene pre-polymer up to 50 g per g of said solid catalyst component.

4 Claims, No Drawings

CATALYST COMPONENTS FOR THE POLYMERIZATION OF OLEFINS

This application is the U.S. national phase of International Application PCT/EP2009/062056, filed Sep. 17, 2009, claiming priority to European Patent Application 08165213.3 filed Sep. 26, 2008, and the benefit under 35 U.S.C. 119(e) of U.S. Provisional Application No. 61/195,129, filed Oct. 3, 2008; the disclosures of International Application PCT/EP2009/062056, European Patent Application 08165213.3 and U.S. Provisional Application No. 61/195,129, each as filed, are incorporated herein by reference.

The present invention relates to prepolymerized catalyst components for the polymerization of olefins, in particular propylene, having specific chemical properties and comprising Mg, Ti and an electron donor selected from esters of aromatic dicarboxylic acids. The catalyst components of the invention are particularly suited for use in gas-phase processes for the polymerization of olefins, in particular propylene.

The behavior of a gas phase reactor is well known in the art. When correctly operated this kind of polymerization technique is able to give polymers endowed with good properties with a relatively low investment cost. In gas-phase reactors the reactor throughput is proportional to the amount of polymerization heat that can be removed from the fluidized bed. Heat is exchanged by means of the recirculation gas and in some processes a partial condensation occurs and the resulting liquid is injected into the polymer bed. In this case it can be said that the process is operating in condensing mode.

Reactor throughput is generally pushed to its maximum by increasing gas mass flow rate up to the value allowed by limit fluidization gas velocity. Exceeding this limit, a significant portion of polymer particles is entrained by recirculation gas: as a consequence, gas recirculation pipe and fan sheeting occurs, heat exchangers tubes and distribution grid plug. As a consequence, the maintenance cost becomes higher, the manufacturing time longer and production losses are also involved.

The entrainment velocity is a direct function of particle size and density. Bigger and/or denser particles allow higher fluidization gas velocity and therefore, in order to optimize the gas velocity, polymer density should be kept up to the maximum value allowed by final application grade, while small polymeric fraction is to be avoided.

Small polymeric fractions, so called fines, are generated when, due to the high activity during the initial stages of polymerization, the catalyst becomes irregularly fragmented. It is known to the skilled in the art and described in many publications such as EP-A-541760, that in order to solve these problems, it is advised to use catalyst precursors which are prepolymerized in-line, i.e., using a pre-polymerization unit aggregated in the process set up so as to continuously prepolymerize and feed the prepolymerized catalyst to the first polymerization reactor. Due to the prepolymerization, the catalyst particles become bigger and also increase their resistance in such a way that the tendency to break under polymerization conditions is decreased. As a consequence, the catalyst is able to produce bigger polymer particles and also the formation of fines is reduced. Although this solution provides good results it is only applicable to polymerization plants provided with the prepolymerization unit connected to the first polymerization reactor. In fact, it would be impossible or involving too high investment costs, modifying the plants not already provided with the prepolymerization unit. Accordingly, those plants should be fed with a prepolymerized catalyst coming from a separate batch prepolymerization unit. However, prepolymerized catalysts used after storage generally suffer from the aging problem. WO99/48929 describes the use of a prepolymerized catalyst component characterized by comprising a solid catalyst component, comprising Ti, Mg, halogen and an electron donor compound, which is prepolymerized with ethylene to such an extent that the amount of the ethylene prepolymer is up to 100 g per g of said solid catalyst component. The electron donor can be selected among various type of classes, like ethers and esters of aromatic mono or dicarboxylic acids (benzoates, phthalates). According to this document, the prepolymerization with ethylene makes possible to reduce, or totally avoid, the loss of activity due to the aging phenomena involved with the storage of the catalyst. It is generically said that the internal electron donor, of any type, is used in molar ratio with respect to the $MgCl_2$ of from 0.01 to 1, preferably from 0.05 to 0.5. No criticality is associated with the Mg/Ti molar ratio of the catalyst. Taking into account the examples 1-2 and comparison example 3, which relate to the catalyst systems based on the esters of the phthalic acids as internal donors that are those most widely used commercially, it can be seen that the activities are not completely satisfactory.

Moreover, it has been noted that storage drums containing oily slurry of prepolymerized catalyst, sometimes are impossible to fully unload as a certain aliquot of catalyst remains adhering either to the walls or to the bottom of the drum. This of course makes the unloading process more difficult or partially failing and both drawbacks are not acceptable in the operation of a commercial plant.

Now it has been surprisingly found that when the Mg/Ti molar ratio and the internal donor/Mg molar ratio are kept within narrow and well defined ranges it is possible to greatly improve the activity of the prepolymerized catalyst, particularly in the gas-phase polymerization of olefins, and to at least minimize the afore mentioned unloading problems. Accordingly, it is an object of the present invention a pre-polymerized catalyst component for the polymerization of olefins $CH_2$=CHR, wherein R is hydrogen or a $C_1$-$C_{12}$ hydrocarbyl group, comprising a solid catalyst component characterized by comprising Mg, Ti halogen and an electron donor (ID) selected from the alkyl esters of aromatic dicarboxylic acids in such an amount that the a molar ratio ID/Mg ranges from 0.025 to 0.065 and the Mg/Ti molar ratio is higher than 13, said solid catalyst component containing an amount of ethylene polymer up to 50 g per g of said solid catalyst component.

Preferably, the ID/Mg molar ratio ranges from 0.030 to 0.055 and most preferably from 0.035 to 0.050. In a preferred embodiment the Mg/Ti molar ratio is higher than 14 and most preferably higher than 15. Especially it ranges from 15 to 30.

Preferably, the amount of ethylene polymer ranges from 0.1 to 15 g, more preferably said amount ranges from 0.5 to 5 g and in particular from 0.5 to 3 g per g of solid catalyst component.

The solid catalyst component in its non pre-polymerized form is also characterized by a porosity, measured by the mercury method, due to pores with radius equal to or lower than 1 μm, ranging from 0.45 $cm^3$/g to 1 $cm^3$/g, preferably from 0.5 $cm^3$/g to 0.9 $cm^3$/g and more preferably from 0.6 to 0.9 $cm^3$/g.

The electron donor compound (ID) is preferably selected from $C_1$-$C_{20}$ alkyl esters of phthalic acids, possibly substituted. Particularly preferred are the $C_1$-$C_6$ linear or branched alkyl esters. Specific examples are, diethyl phthalate, di-n-propyl phthalate, di-n-butyl phthalate, di-n-pentyl phthalate, di-i-pentyl phthalate, bis(2-ethylhexyl) phthalate, ethyl-isobutyl phthalate, ethyl-n-butyl phthalate, di-n-hexyl phthalate, di-isobutylphthalate.

In the solid catalyst component of the invention the Mg, Ti and halogen atoms preferably derive from a titanium compound having at least a Ti-halogen bond and an Mg halide. The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are selected among those of formula $Ti(OR)_{n-y}X_y$, where n is the valence of titanium, y is a number between 1 and n, X is halogen and R is a hydrocarbon radical having from 1 to 10 carbon atoms. Among them, $TiCl_4$ and $TiCl_3$ are the most preferred.

The preparation of the solid catalyst component can be carried out according to several methods.

According to a preferred method, the solid catalyst component can be prepared by reacting a titanium compound of the formula described above, preferably $TiCl_4$, with a magnesium chloride deriving from an adduct having formula $MgCl_2pROH$, where p is a number between 0.1 and 6, preferably from 2 to 3.5, and R is a hydrocarbon radical having 1-18 carbon atoms, preferably ethyl. The adduct can be prepared in suitable spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. The desired average particle size is obtained by modulating the energy provided to the system by way of shear stresses. Generally speaking, smaller particles can be obtained by increasing the shear stress and therefore the extent of stirring in the stage of mixing the molten $MgCl_2$-alcohol adduct with the inert hydrocarbon.

Depending on the energy provided to the system the average size of the spherical particles of the adduct can vary from 5 to 100 μm while most commonly is in the range from 10 to 90 μm depending on the desired application of the final catalyst.

The particle size distribution (SPAN) of the adduct is generally lower than 1.5, calculated with the formula $$\frac{P90 - P10}{P50}$$

where, in a particle size distribution curve determined according to the same method, wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value. The average particle size (APS) of the adduct particle, of the non prepolymerized catalyst component and of the prepolymerized catalyst component and their particle size distribution as well, are determined with the method described in the characterization section which is based on optical diffraction.

The particle size distribution can be inherently narrow by following the teaching of WO02/051544. However, in alternative to this method or to further narrow the SPAN, largest and/or finest fractions can be eliminated by appropriate means such as mechanical sieving and/or elutriation in a fluid stream.

The adduct particles can be directly reacted with Ti compound or it can be previously subjected to thermal controlled dealcoholation (80-130° C.) so as to obtain an adduct in which the number of moles of alcohol is generally lower than 3 preferably between 0.1 and 2.5. The reaction with the Ti compound can be carried out by suspending the adduct particles (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times and it is preferably carried out at least two times. The electron donor compound can be added during the treatment with $TiCl_4$. It can be added together in the same treatment with $TiCl_4$ or separately in two or more treatments. In any case the donor should be used in this stage in amount with respect to the $MgCl_2pROH$, such as to have a ID/Mg ratio ranging from 0.08 to 0.14 and more preferably from 0.09 to 0.13.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$.

In the above mentioned preparation methods the esters of aromatic dicarboxylic acids, can be added as such or, in an alternative way, they can be obtained in situ by using an appropriate precursor capable to be transformed in the desired electron donor compound by means, for example, of known chemical reactions such as esterification, transesterification, etc.

The prepolymerization is normally carried out in the presence of an Al-alkyl compound. The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$. The use of tri-n-octylaluminum is especially preferred.

It has been found particularly advantageous to carry out the prepolymerization using low amounts of alkyl-Al compound. In particular, said amount could be such as to have an Al/catalyst weight ratio from ranging from 0.001 to 10, preferably from 0.005 to 5 and more preferably from 0.01 to 2.5. An external donor selected from silicon compounds, ethers, esters, amines, heterocyclic compounds, ketones and 1,3-diethers of the general formula (I) previously reported can also be employed. However, it has been found advantageous in order to preserve the catalyst activity for longer times, to carry out the prepolymerization without using an external donor.

The pre-polymerization can be carried out in liquid phase, (slurry or solution) or in gas-phase at temperatures generally lower than 50° C., preferably between −20 and 40° C. and more preferably between −10 and 30° C. Preferably it is carried out in a liquid diluent in particular selected from liquid hydrocarbons. Among them, pentane, hexane and heptane are preferred. The prepolymerized catalyst of the invention are further characterized by an apparent density ranging from 0.30 to 0.45 g/cm$^3$ preferably from 0.35 to 0.40 g/cm$^3$ measured as described in the characterization section. It has been found that the prepolymerized catalyst of the invention, in addition to the very high activity also show an improved behavior in terms of handling expressed as very small amount of catalyst remaining in the drum after unloading. Prepolymerized catalysts with apparent density are obtained by subjecting the solid catalyst components with the specific ID/Mg and Mg/Ti molar ratio can be obtained by operating under carefully controlled prepolymerization conditions in terms of reactor loading, temperature, aluminum alkyl concentration and stirring velocity. In particular, operating at relatively low reactor loading, relatively high stirring velocity, at low aluminum alkyl and ethylene concentration for long reaction times avoids or minimizes the formation of aggregated particles which lower the apparent density. In particular, it is preferred to feed the total amount monomer to be prepolymerized in a time longer than 8 hours preferably longer than 10 hours and especially longer than 15 hours.

The extent of pre-polymerization is such that the amount of ethylene polymer is up to 50 grams per gram of solid catalyst component. Therefore, according to the present invention, the term pre-polymer means an ethylene polymer generated in an amount up to 50 grams per gram of solid catalyst component, preferably from 0.1 to 15 g, more preferably said amount ranges from 0.5 to 5 g and in particular from 0.5 to 3 g per g of solid catalyst component.

The extent of prepolymerization can be easily controlled by monitoring, according to known techniques, the amount of monomer that is being polymerized. According to the present invention the solid catalyst component is to be prepolymerized with ethylene but also minor amounts of C3-C10 olefin comonomers can be polymerized together with it although their amount in the final ethylene polymer should be less than 15% wt.

Due to the pre-polymerization, the final average particle size of the prepolymerized catalyst component may be larger than that of the original not prepolymerized solid catalyst component and preferably range from 15 to 150 µm, preferably from 20 to 100 µm.

The particles of said catalyst components in non prepolymerized form preferably have spherical morphology which means that the ratio between maximum and minimum diameter is lower than 1.5 and preferably lower than 1.3.

The prepolymerized solid catalyst components according to the present invention are used in the polymerization of olefins by reacting them with organoaluminum compounds according to known methods.

In particular, it is an object of the present invention a catalyst for the polymerization of olefins CH$_2$=CHR, wherein R is hydrogen or a C$_1$-C$_{12}$ hydrocarbyl radical comprising the product of the reaction between:

(i) the prepolymerized solid catalyst component as disclosed above and (ii) an alkylaluminum compound.

The alkyl-Al compound (ii) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as AlEt$_2$Cl and Al$_2$Et$_3$Cl$_3$, possibly in mixture with the above cited trialkylaluminums.

When used in the polymerization of propylene, in order to get high values of isotacticity and xylene insolubility, the catalyst system mentioned above can be used in combination with an external donor (iii).

Suitable external electron-donor compounds include silicon compounds, ethers, esters, amines, heterocyclic compounds and particularly 2,2,6,6-tetramethyl piperidine, ketones and the 1,3-diethers of the general formula (I) previously reported.

The class of preferred external donor compounds is that of silicon compounds of formula R$_a^5$R$_b^6$Si(OR$^7$)$_c$, where a and b are integers from 0 to 2, c is an integer from 1 to 3 and the sum (a+b+c) is 4; R$^5$, R$^6$, and R$^7$, are alkyl, cycloalkyl or aryl radicals with 1-18 carbon atoms optionally containing heteroatoms. Particularly preferred are the silicon compounds in which a is 1, b is 1, c is 2, at least one of R$^5$ and R$^6$ is selected from branched alkyl, cycloalkyl or aryl groups with 3-10 carbon atoms optionally containing heteroatoms and R$^7$ is a C$_1$-C$_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, (2-ethylpiperidinyl)t-butyldimethoxysilane, (2-ethylpiperidinyl)thexyldimethoxysilane, (3,3,3 -trifluoro-n-propyl)(2-ethylpiperidinyl)dimethoxysilane, methyl(3,3,3-trifluoro-n-propyl)dimethoxysilane. Moreover, are also preferred the silicon compounds in which a is 0, c is 3, R$^6$ is a branched alkyl or cycloalkyl group, optionally containing heteroatoms, and R$^7$ is methyl. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins CH$_2$=CHR, wherein R is hydrogen or a C$_1$-C$_{12}$ hydrocarbyl group, carried out in the presence of a catalyst comprising the product of the reaction between:

(i) the prepolymerized solid catalyst component above described;

(ii) an alkylaluminum compound and, (iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. However, as mentioned above, it has been found particularly advantageous the use of such catalyst systems in the gas-phase polymerization process where they allow obtaining higher yields in conjunction with valuable morphological properties expressed by high values of bulk density. Also, different polymerization stages in sequence may be applied for example by first preparing a relatively high crystallinity propylene homo or copolymer in a liquid phase stage and then in a subsequent gas-phase stage, carried out in the presence of the product coming from the first stage, a relatively low crystallinity propylene copolymer can be produced. This kind of products is also commonly referred as propylene heterophasic copolymers.

The gas-phase process or stage can be carried out operating in one or more fluidized or mechanically agitated bed reactors. Typically, in the fluidized bed reactors the fluidization is obtained by a stream of fluidization gas the velocity of which is not higher than transport velocity. As a consequence the bed of fluidized particles can be found in a more or less confined zone of the reactor. Also, said catalysts are usable in gas-phase polymerization devices comprising at least two interconnected polymerization zones. Said polymerization process is described in the European patent EP 782587.

It is worth noting that the use of the prepolymerized catalyst of the invention is particularly advantageous in fluidized-bed reactors not provided with an upstream prepolymerization section. Notwithstanding that, it allows obtaining polymers, in particular propylene polymers, with bulk densities higher than 0.43 g/cm$^3$ in conjunction with activities of about 20 Kg/g of solid catalyst component.

The polymerization is generally carried out at temperature of from 40 to 120° C., preferably of from 40 to 100° C. and more preferably from 50 to 90° C. The polymerization is carried out in gas-phase the operating pressure is generally between 0.5 and 5 MPa, preferably between 1 and 4 MPa. In the bulk polymerization the operating pressure is generally between 1 and 8 MPa preferably between 1.5 and 5 MPa.

The following examples are given in order to better illustrate the invention without limiting it.

Characterization

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

Average Particle Size of the Adduct and Catalysts

Determined by a method based on the principle of the optical diffraction of monochromatic laser light with the "Malvern Instr. 2600" apparatus. The average size is given as P50.

Average Particle Size of the Polymers

Determined through the use Tyler Testing Sieve Shaker RX-29 Model B available from Combustion Engineering Endecott provided with a set of six sieves, according to ASTM E-11-87, of number 5, 7, 10, 18, 35, and 200 respectively.

Determination of Apparent Density.

100 g of Winog 70 oil commercialized by Tudapetrol are introduced in a graduated cylinder. Successively a weighted amount (30-40 g) of prepolymerized catalyst sample is introduced and let to settle for 24 hours. After that time the height of packed bed of catalyst is measured and its occupied volume determined by geometrical calculation. The apparent density is obtained by dividing the weight of the catalyst sample by the occupied volume.

EXAMPLES

Example 1

Preparation of the Solid Catalyst Component

An initial amount of microspheroidal MgCl$_2$.2.8C$_2$H$_5$OH was prepared according to the method described in ex.2 of WO98/44009 but operating on larger scale and setting the stirring conditions so as to obtain an adduct having an average particle size of 25 μm. Into a 500 ml four-necked round flask, purged with nitrogen, 250 ml of TiCl$_4$ were introduced at 0° C., while stirring, 15 g of microspheroidal adduct prepared as described above. The flask was heated to 40° C. and diisobutylphthalate (DIBP) was added in an amount such as the DIBP/Mg ratio was 0.111. The temperature was raised to 100° C. and maintained for two hours, then the stirring was discontinued, the solid product was allowed to settle and the supernatant liquid was siphoned off.

Then the treatment with TiCl$_4$ was repeated two more times, omitting the use of DIBP, at a temperature of 120° C. The solid obtained was washed six times with anhydrous hexane (6×100 ml) at 60° C. and then dried under vacuum: The characteristics of the catalyst components and the results of the propylene polymerization test procedure are reported in table 1.

Preparation of the Pre-polymerized Catalyst

Into a 60 liters stainless steel reactor, 35 liters of hexane at temperature of 20° C. and, whilst stirring at about 80 rpm, 1500 g of the spherical catalyst prepared as described above, were introduced. Keeping constant the internal temperature, 24 g of tri-n-octyl aluminum (TNOA) in hexane were (slowly) introduced at room temperature into the reactor. Then ethylene was carefully introduced into the reactor at the same temperature, with a constant flow for 18 h. The polymerization was discontinued when a theoretical conversion of 1 g of polymer per g of catalyst was deemed to be reached. After 3 hexane washing at T=20° C. (50 g/l), the resulting pre-polymerized catalyst was dried and analyzed. It contained 1.3 g of polyethylene per g of solid catalyst and its apparent density was 0.390 g/cm$^3$.

Comparison Example 1

The same procedure described in example 1 was carried out with the difference that a higher amount of DIBP was used bringing to a ID/Mg molar ratio of 0.15. The characteristics of the final catalyst are shown in Table 1.

Comparison Example 2

A prepolymerized catalyst was prepared according to example 1 of WO99/48929. The characteristics of the final catalyst are shown in Table 1.

Gas-Phase Propylene Polymerization

Polymerization Procedure for the Preparation of Propylene Heterophasic Copolymers The heterophasic propylene copolymers were produced in a pilot plant set-up comprising two serially connected gas-phase reactors. Polymerization is started by feeding separately in a continuous and constant flow the prepolymerized catalyst component in a propylene flow, the aluminum triethyl (TEAL), dicyclopentyldimethoxysilane (DCPMS) as external donor, hydrogen (used as molecular weight regulator) and the monomers in the amounts and under the conditions reported in table 2.

The polymer particles exiting the second reactor are subjected to a steam treatment to remove the reactive monomers and volatile substances, and then dried.

TABLE 1

|  | Example | | |
| --- | --- | --- | --- |
|  | 1 | Comp. 1 | Comp. 2 |
| DIBP/Mg | 0.043 | 0.073 | 0.044 |
| Mg/Ti | 15.8 | 12 | 12 |
| Apparent density g/cm$^3$ | 0.390 | 0.285 | 0.292 |
| % wt Residual after unloading | 2 | 8 | 5 |

TABLE 2

| | | Example No. | | | | | |
|---|---|---|---|---|---|---|---|
| | | 1 | | Comp. 1 | | Comp. 2 | |
| | | 1st Reactor | 2nd reactor | 1st Reactor | 2nd Reactor | 1st Reactor | 2nd Reactor |
| T | °C. | 75 | 70 | 75 | 70 | 75 | 70 |
| P | Barg | 24 | 16 | 24 | 16 | 24 | 16 |
| Residence time | Min | 50 | 22 | 54 | 22 | 54 | 22 |
| TEAL/DCPMS | Wt ratio | 8 | — | 8 | — | 8 | — |
| TEAL/catalyst (neat) | Wt ratio | 5 | — | 5 | — | 5 | — |
| $C_3^-$ | % mol | 94.1 | 52.7 | 95.2 | 53.2 | 95.6 | 54.5 |
| $H_2/C_3^-$ | Mol. Ratio | 0.046 | — | 0.046 | — | 0.046 | — |
| $H_2/C_2^-$ | Mol. Ratio | — | 0.13 | — | 0.12 | | 0.13 |
| $C_2^-/C_2^- + C_3^-$ | Mol. Ratio | — | 0.43 | — | 0.44 | | 0.43 |
| Split | % | 81 | 19 | 80 | 20 | 79 | 21 |
| Mileage | g/g | 8600 | 10600 | 5900 | 7300 | 6500 | 7930 |
| Xylene solubles | Wt %/ | 1.7 | 17 | 1.6 | 18 | 1.8 | 16 |
| Bulk Density | g/cm³ | 0.452 | 0.445 | 0.444 | 0.45 | | 0.43 |
| $C_2^-$ total | % | — | 10 | — | 10.9 | | 10.7 |
| XSIV | | | 2.7 | | 2.9 | | 3 |
| MFR | g/10' | 13.1 | 10.2 | 15 | 7.6 | 14.2 | 8.5 |

What is claimed is:

1. A prepolymerized catalyst component for the polymerization of olefins comprising:
   (i) a solid catalyst component comprising Mg, Ti, and halogen atoms and an electron donor (ID) selected from $C_1$-$C_6$ linear or branched alkyl esters of aromatic dicarboxylic acids in such an amount that the ID/Mg molar ratio ranges from 0.035 to 0.043 and the Mg/Ti molar ratio is from 15.8 to 30, and
   (ii) an ethylene polymer,
wherein the prepolymerized catalyst component contains from 0.5 to 3 grams of ethylene polymer per gram of the solid catalyst component, and has an apparent density ranging from 0.35 to 0.39 g/cm³.

2. A catalyst system for the polymerization of olefins $CH_2$=CHR, in which R is hydrogen or a hydrocarbyl radical with 1-12 carbon atoms, comprising the product of the reaction between:
   (i) the prepolymerized solid catalyst component according to claim 1; and
   (ii) tri-n-octyl aluminum.

3. A process comprising polymerizing olefins, $CH_2$=CHR, wherein R is hydrogen or a $C_1$-$C_{12}$ hydrocarbyl group, carried out in the presence of the catalyst system of claim 2.

4. The catalyst system of claim 2, further comprising an external electron donor compound selected from the group consisting of methylcyclohexyldimethoxysilane, diphenyldimethoxysilane, methyl-t-butyldimethoxysilane, dicyclopentyldimethoxysilane, (2-ethylpiperidinyl)t-butyldimethoxysilane, (3,3,3-trifluoro-n-propyl)(2-ethylpiperidinyl)dimethoxysilane and methyl(3,3,3-trifluoro-n-propyl)dimethoxysilane.

* * * * *